Aug. 20, 1935.　　　　J. H. OETJEN　　　　2,012,017
GAS ANALYSIS APPARATUS
Filed July 30, 1932
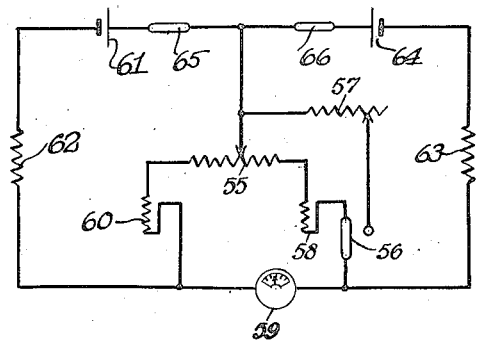
INVENTOR
JOHN H. OETJEN
BY
ATTORNEY Patented Aug. 20, 1935

2,012,017

UNITED STATES PATENT OFFICE 2,012,017

GAS ANALYSIS APPARATUS

John H. Oetjen, Maplewood, N. J., assignor to Charles Engelhard, Inc., Newark, N. J., a corporation of New Jersey Application July 30, 1932, Serial No. 626,465

2 Claims. (Cl. 73—51)

The invention relates to improvements in apparatus for ascertaining the composition of gaseous mixtures, or rather the percentage present of one of its constituents, and is concerned more particularly with apparatus utilizing analysis cells comprising a thin wire adapted to be surrounded by the gas whose composition is to be determined, the wire being heated by a strong electric current and its resistance being affected by the heat conductivity of the surrounding gas or gaseous mixture so that the temperature and ohmic resistance of the wire are functions of the character of the gas or gaseous mixture. Thus, the character of the gas or the percentage composition of the gaseous mixture may be ascertained by measuring the resistance of the wire.

Heretofore, such measurement has been effected by means of an electrical system of the nature of a Wheatstone bridge and wherein opposite branches of the bridge consisted of thin wires having relatively low ohmic resistance and high temperature coefficients and heated by a strong electric current of constant voltage, the wires being disposed respectively within two chambers, the one being filled with a standard gas or gas of known composition and the other with the gas to be tested.

The present invention has for its object to simplify the measuring apparatus and system utilized in connection with analysis cells of the aforesaid nature, and the provision to this end of direct reading means wherefrom the percentage of the particular gas present in a gaseous mixture may be read directly from a calibrated element of the system.

A further object of the invention resides in the provision of simple and readily operated electrical devices for obtaining the measurements.

Still another object of the invention resides in the provision of means for checking the operating circuit.

Another object of the invention is to provide gas analysis apparatus of the aforesaid nature in which but a single analysis cell may be utilized, if desired.

The nature of the invention, however, will best be understood when described in connection with the accompanying drawing, in which:

The figure is a wiring diagram of gas analysis apparatus of the thermal conductivity type embodying my invention.

Referring to the drawing, there is shown two circuits connected in parallel, one of said circuits including a standard cell 60 in series with a source of potential 61 and a ballast resistance 62, the other circuit including an analysis cell 58 in series through switch 56 with a balance resistance 63 and a source of potential 64. Switches 65 and 66 in the respective parallel connected circuits are provided to individually open said circuits.

The two circuits are connected by a single adjustable resistance 55 and a double-throw single-pole switch 56. By throwing the switch 56 to the right as shown in the drawing, a checking resistance 57 can be substituted for analysis cell 58. In this embodiment of my invention, in which there is but a single adjustable resistance 55, such resistance serves only to effect a balance between the current flowing through the parallel connected circuits; and as no compensating rheostat is utilized the galvanometer 59, which is substantially in parallel with the resistance 55 when the switch 56 is thrown to the left to close the circuit through the analysis cell 58, can be calibrated directly in terms of percentage gas composition and the readings taken directly therefrom.

In operation, the switch 56 is moved to close the circuit through the analysis cell 58 and the resistances 62 and 63 are adjusted until the pointer of the galvanometer 59 comes to a predetermined point. The switch 56 is then moved to disconnect the analysis cell 58 from the circuit and to include in the circuit the checking resistance 57. When this is done, the pointer of the galvanometer will deflect from the predetermined point, and checking resistance 57 is adjusted until the pointer again comes to the predetermined position on the galvanometer scale.

By means of this arrangement, it is possible to check the condition of the analysis cell from time to time by moving the switch 56 to place the checking resistance into the circuit and then moving the switch to throw the analysis cell into the circuit. When air is passing through both the standard cell and the analysis cell, there should be no deflection of the galvanometer pointer when the switch is moved either to throw the checking resistance in the circuit or to place the analysis cell 58 in the circuit.

This arrangement also enables the galvanometer to be calibrated to read directly in terms of percentage gas composition.

I claim:

1. In a gas analysis apparatus of the thermal conductivity type, a first circuit including a switch, a source of constant potential, a fixed resistance and a standard cell, a second circuit including a switch, a source of constant potential, a fixed resistance, a third switch and an analysis cell, a variable resistance interposed between the standard cell and the analysis cell and connecting the two circuits at one end thereof, adjusting means engaging the variable resistance and electrically connecting the two circuits at the other ends thereof, a second variable resistance connected to the adjusting means, said third switch being adapted to disconnect the analysis cell from the second circuit and to connect the second variable resistance to said second circuit, and an electrical measuring instrument connected to the standard cell and to the third switch.

2. In a gas analysis apparatus of the thermal conductivity type, a first circuit including a source of constant potental and a standard cell, a second circuit including a constant source of potential and a switch and an analysis cell, a variable resistance interposed between the standard cell and the analysis cell and connecting the two circuits at one end thereof, adjusting means engaging the variable resistance and electrically connecting the two circuits at the other ends thereof, a second variable resistance connected to the adjusting means, said switch being adapted to disconnect the analysis cell from the second circuit and to connect the second variable resistance to said second circuit, and an electrical measuring instrument connected to the standard cell and to the switch.

JOHN H. OETJEN.